United States Patent
Greubel et al.

[11] 3,806,227
[45] Apr. 23, 1974

[54] ARRANGEMENT FOR A MULTI-COLOR DATA INDICATION

[75] Inventors: Waldemar Greubel; Hans Krueger; Ulrich Wolff, all of Munich, Germany

[73] Assignee: Siemens Aktiengesellschaft, Berlin & Munich, Germany

[22] Filed: Sept. 6, 1972

[21] Appl. No.: 286,773

[30] Foreign Application Priority Data
Sept. 28, 1971 Germany.............................. 214827

[52] U.S. Cl. ............ 350/150, 350/152, 350/160 LC
[51] Int. Cl. ...... G02b 1/06, G02b 27/28, G02f 1/26
[58] Field of Search...................... 350/150, 160 LC

[56] References Cited
UNITED STATES PATENTS

| | | | |
|---|---|---|---|
| 3,625,591 | 12/1971 | Freiser et al.............. | 350/160 LC X |
| 3,597,043 | 8/1971 | Dreyer........................... | 350/150 X |
| 3,704,056 | 11/1972 | Wysocki et al.......... | 350/160 LO X |
| 3,592,527 | 7/1971 | Conners et al.............. | 350/150 UX |

*Primary Examiner*—John K. Corbin
*Attorney, Agent, or Firm*—Hill, Sherman, Meroni, Gross & Simpson

[57] ABSTRACT

Anarrangement for providing alpha-numeric indications with a high contrast with the indication being either white on colored background, a color on a different color background or black on a color background characterized by using a liquid crystal cell with a source of light either projected through the cell or reflected by the cell. To improve the contrast between the indication and the background, the arrangement utilizes a neutral polarizer, means for selectively polarizing a portion of the beam to a predetermined direction and a second means for selectively changing the characteristic of the light rays of the light beam with the liquid crystal disposed between the neutral polarizer and first means. In one embodiment, the light beam passes through a selective polarizer which polarizes all light except one color, through the cell and then through the second polarizer which blocks the polarized light resuting in only the unpolarized color being observed. When an electrical field is applied to a selected portion of the liquid crystal cell, the selected portion depolarizes the polarized light causing a white light to be observed on a color background which white light has the shape of the selected portion. A second embodiment utilizes a liquid crystal cell in a reflecting mode of operation with the cell between a polarizer and a selective polarizer. A third embodiment utilizes a delay layer or plate which is a birefringent layer that rotates a polarization direction of light around a wavelength-dependent angle, which light passes a polarizer to produce a beam of one color, then the ligt passes a second layer for further rotation of the polarization direction, through the cell and a third polarizer to be viewed as a different color. When a portion of the cell is activated to a scattering mode by applying an electric field to a selected portion, the selected portion of the cell depolarizes the light to provide a viewer with an indication of the one color on the background of the other color.

17 Claims, 3 Drawing Figures

PATENTED APR 23 1974         3,806,227

3,806,227

ARRANGEMENT FOR A MULTI-COLOR DATA INDICATION

BACKGROUND OF THE INVENTION

1. Field of the Invention

The present invention is directed to an arrangement utilizing a liquid crystal cell to produce indication with a high contrast between the indicator and background.

2. Prior Art:

A nematic liquid crystal has in an undisturbed condition a parallel arrangement of its elongated molecules which arrangement gives the liquid crystal an optical anisotropy. When an electrical field of a given magnitude is applied to the liquid crystal, the parallel arrangement of the molecules is destroyed with respect to space and time and liquid crystal will disperse or scatter light directed thereon. This condition is known as "Dynamic Scattering."

The effect of "Dynamic Scattering" has been utilized for display arrangement and a rather detailed discussion of liquid or fluid crystals is contained in an article by George H. Heilmeier, Lewis A. Zanoni and Lucian A. Barton "Dynamic Scattering: A New Electro-optic Effect in Certain Classes Nematic Liquid Crystals". Proceedings of the IEEE, published by The Institute of Electrical and Electronics Engineers, Inc., Volume 56, No. 7, July 1968, pages 1162–1171. A liquid crystal cell or matrix is formed by placing a layer of nematic liquid crystal between a pair of glass plates which plates are each provided with a plurality of segmented electrodes which can apply an electrical field to discrete areas or portions of the cell to produce the dynamic scattering in selected patterns. If the one plate or electrodes on the one plate are reflecting light and the other plate and its electrodes are transparent, an observer on the side of the transparent electrode will see a black part of the reflected background when light is directed from the observer onto the cell if the liquid crystal is not energized to the scattering condition by an electrical field. When voltage is applied to the various electrodes in a desired pattern to form a sign or character, the electrical field created by the electrode causes dynamic scattering in the desired area and the observer will see a bright sign or character on a black background. This mode of operation is known as a reflecting mode of operation.

If the two plates and their electrodes are transparent, a light transmission mode of operation can be used by the observer being on an opposite side from the source of light and the viewing angle being different from the illumination angle. With no voltage applied to the electrodes, almost the entire light of the source will be transmitted through the device and will not reach the observer. If a voltage is applied to selected electrodes to produce a pattern, the order in the liquid crystal will be destroyed in an area corresponding to the applied field and the light being transmitted by this area will be scattered toward the observer. The observer will see a bright sign on a dark background.

However, both types of display device have the same drawback of a relative small contrast between the sign and the background.

SUMMARY OF THE INVENTION

The present invention is directed to providing an arrangement for producing multi-color data indication having a very strong contrast between the indication and background and if desired a colored indication on a differently colored background. The arrangement utilizes a light source, a layer of liquid crystal disposed between a pair of plates which have means thereon for applying an electrical field to portions of the layer to change the optical properties of areas of the layer with the improvements comprising a neutral polarizer, and means for selectively polarizing a portion of the wavelengths of the light beam. The liquid crystal layer is arranged between the means for selectively polarizing and the neutral polarizer so that a selected color is seen by an observer when no electrical field is applied to the layer and when a field is applied to a portion of the layer, the portion depolarizes the light to cause a different color to be observed in a pattern corresponding to the pattern of the applied electrical field. In one embodiment the means is a selective polarizer which polarizes all light except for a certain color. In another embodiment, the first means comprises a neutral polarizer and a delay plate or foil which is a birefringent material and transforms linearly polarized light into elliptically polarized light, the angular location of the axes and the eccentricity of the polarization ellipse being dependent on the wavelength. The layer of liquid crystal is preferably a nematic liquid crystal with a high resistance and may be a mixture of nematic and cholesteric materials. While the layer may be colorless, if desired the layer of liquid crystal may be colored or one of the plates may be colored to provide a desired color combination. A color absorption foil may be provided or in its place a second delay plate and neutral polarizer may be used. The arrangement may include a diffusing or dispersing member which can be separate or part of an electrode or one of the pair of plates to increase the angle of observation for the arrangement.

DESCRIPTION OF THE PREFERRED EMBODIMENTS

Figure 1:
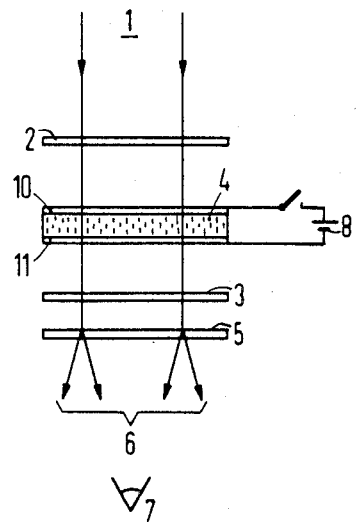
FIG. 1 is a schematic presentation of an embodiment of the arrangement according to the present invention.

The principles of the present invention are particularly useful when incorporated in an arrangement schematic illustrated in FIG. 1 in which an unpolarized, white, parallel light beam 1 is directed through a selective polarizer or selective polarization filter 2 which has the properties of polarizing all of the light except for a selected portion of the spectrum or selected color. Thus the light passing through the polarizer 2 is a certain color that is unpolarized and the rest of the spectrum has a polarization in a given direction. An example of a commercially available selective polarizer or polarization filter 2 consists of a plastic foil with embedded dichroitic molecules and is sold under the tradename "Polaroid Variable Red." These polarization filters pass the red part of the color spectrum unpolarized.

The light passing through the polarizer 2 is directed at a liquid crystal cell or matrix which has a layer 4 of liquid crystal that is disposed and contained between a pair of transparent glass plates 10 and 11. Each of the plates 10 and 11 are provided with transparent electrodes which may be a coating of tin oxide. Preferably, the electrodes are segmented to enable the application of an electric field to selected areas of the layer 4, which has a thickness of several $\mu$m, to cause dynamic scatter in the layer over an area having a configuration of a character or sign of the indication. To provide a voltage for each of the electrodes a voltage source 8 is provided.

The light leaving the matrix passes to a neutral polarizer or polarization filter 3 which will polarize the complete spectrum and is arranged in the direction of polarization perpendicular to the direction of polarizer 2 so that light polarized by polarizer 2 is blocked. Thus, the polarization filter 3 only passes the color which was not polarized by the polarizer 2 and this color which is indicated by the element 6 is seen by an observer located at 7.

Depending on the treatment of the surfaces of the glass plates and the coated electrodes, the longitudinal molecules of the liquid crystal will align themselves either parallel or perpendicular to the glass plates. In either orientation, the molecules will realign themselves after their orientation has been distorted by the application of an electric field to the previous orientation spontaneously after removal of the field. A diffusing disc or member 5 may be provided to increase the angle of observation. If the glass plate 11 has a diffusing or dispersing characteristic, then the member 5 may not be necessary.

The member 5 can be left out entirely when the arrangement has a layer 4 in which molecules align themselces when no field is applied parallel to the glass plates 10 and 11, and the polarization direction of the light leaving polarizer 2 is selected parallel or vertical to the preferred direction of the liquid crystal molecules. In this case, the arrangement is fully effective even if diffused light is used for the illumination, which already guarantees a large range for the observation possibility.

If no field is applied to the liquid crystal layer 4, the liquid crystal molecules will be directioned vertical or parallel to the glass plates 10 and 11. The liquid crystal matrix is between the blocking polarizers 2 and 3 and optically behaves like a common isotropic liquid, for the light passing therethrough. Thus, nothing changes with respect to the polarization state of the light passing through the matrix. The colored, unpolarized light will permeate the polarization filter 3 while all remaining light is blocked due to the blocking relationship of the two polarizers, and all the light appears to be of one color to the observer 7.

If a voltage in the order of 10 volts is applied to the electrodes, the electrical field between the electrodes will destroy or deform the uniform directioning of the liquid crystal molecules. By applying the voltage to selected electrode pairs, the area of the layer 4 which has its optical properties changed can be made to conform to the configuration of a sign or character. The area of layer 4 having destroyed the uniform directioning will scatter the light and cause a depolarizing of polarized light. Thus, the white light passing through the area of the layers which are energized by the electric field will pass through the polarizer 3 and be visible to the observer 7 as a white sign or character on a colored background.

By inserting a color filter with a corresponding spectral transmission curve into this arrangement, a desired combination of a colored sign or symbol on a differently colored background can be obtained. Due to the special selection of the selective polarization filter 2 and a special colored filter, all colored combinations will be possible between which one can electrically switch over. Instead of applying a colored filter, any desired component of the arrangement may be colored, for instance, a glass plate of the matrix or the liquid crystal layer itself.

Figure 2:
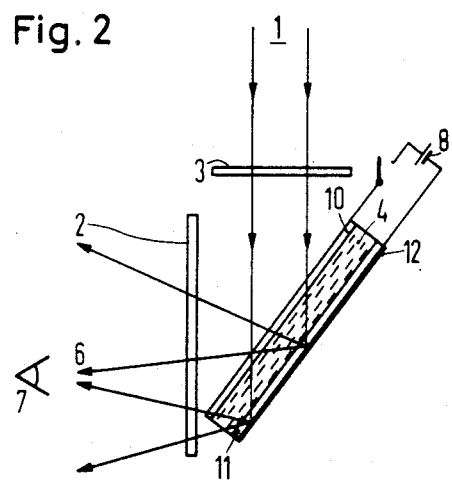
FIG. 2 is a schematic presentation of a second embodiment of an arrangement according to the present invention.

Another embodiment of the arrangement is illustrated in FIG. 2 and this embodiment operates in a reflection mode of operation. The beam 1 of white light is passed through a neutral polarizer 3 which polarizes the entire spectrum. The polarized light is them projected through layer 4 of the liquid crystal matrix and is reflected by a layer 12 of diffusingly reflective material back through the layer 4 and through the selective polarizer 2 which is arranged to block all polarized light except that of a given portion of the spectrum or color. Thus, the observer 7 sees only the light 6 of the particular color. If the segmented electrodes on plate 11 are diffusingly reflective to the light beam 1, the layer 12 may not be necessary.

Preferably, a parallel-oriented liquid crystal layer 4 will be used in this embodiment since in this embodiment the desired angle at which the liquid crystal cell is exposed to white light 1 can be selected and diffused light can be applied as the illumination.

The mode of operation of the arrangement of this embodiment is the same as the embodiment of FIG. 1. The observer 7 will merely perceive a colored surface when no electric field is applied to the liquid crystal cell which color is again determined by the selective polarization properties of the selective polarizer 2. When an electric field is applied to different segments of the electrodes forming a sign or character, this sign will appear white on a colored background or, if one of the components is correspondingly colored, it will appear colored on a differently colored background.

In this embodiment, the position of polarizers 2 and 3 with respect to the matrix is reversed so that the light goes through polarizer 3 before entering the matrix. If desired, the position of polarizers 2 and 3 in both embodiments could be interchanged.

Figure 3:
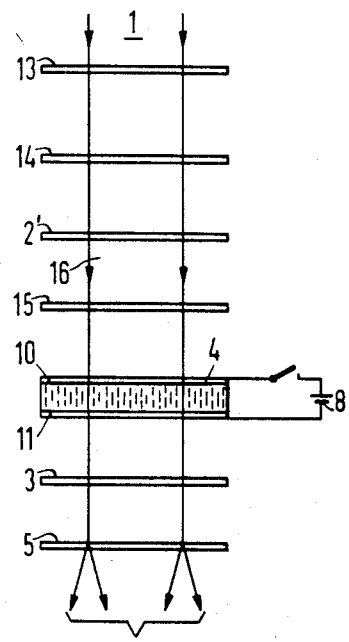
FIG. 3 is a schematic presentation of a third embodiment of the present invention.

A third sample embodiment of an arrangement of the present invention is illustrated in FIG. 3. In this embodiment, three neutral polarizers 2', 3 and 13 and a pair of optical delay plates or foils 14 and 15 which are a birefringent material such as a plastic foil and have a delay ranging preferably between 300 and 1,500 millimicrons, for example 1,000 millimicrons and 1,200 millimicrons, respectively, are utilized. For example, stretched polyester foils, such as sold under the trademark HOSTAPHAN, of different thickness, e.g. 10 $\mu$m and 70 $\mu$m, may be used.

The beam 1 of white light is polarized by polarizer 13 and the delay plate 14 rotates the polarization direction around a wavelength-dependent angle so the light beam 16 passing through the second polarizer 2' will be colored. The delay plate 15 causes a further wavelength-dependent rotation of the polarization direction so that if the layer 4 has a uniform orientation, the light 6 leaving the polarizer 3 and diffusing member 5 has a color which is different from the color of the light 16. When a voltage is applied to the liquid crystal cell, the uniform directioning of the liquid crystal molecule is destroyed, in the same manner as in the proceding embodiments. Thus, the polarization of light between the polarizers 2' and 3 will be destroyed so that delay plate 15 becomes ineffective. Thus the observer sees a sign or character of the color 16 on a background of the color 6.

The suggested arrangement comprises the great advantage that displays with high color contrast can be realized with simple and cheap polarization foils or colored filters or delay foils, respectively, made of plastic.

The voltage threshold for the color switching is given at 5 volts for a liquid-crystal-layer thickness of approximately 6μm. The switching-on times are field-strength-dependent and amount to approximately 3 ms with a voltage of 20 volts. The switching-off times depends on the applied liquid crystal and, on an average, amount to approximately 30 ms.

A further advantage is given by the fact that the switch-on times are shorter by a factor 5 to 10 than the switching-on times for an arrangement utilizing the effect of the dynamic scattering when both arrangements operate at the same field strength. In order to obtain equally short switching times with arrangements utilizing the effect of dynamic scattering much greater voltages are required.

Both nematic liquid crystals which have the effect of dynamic scattering and highly purified nematic liquid crystals which do not show the effect of dynamic scatterings are suited as liquid crystals in the arrangements of the present invention. Nematic liquid crystals of the last-mentioned kind have a conductivity which is several orders smaller than the conductivity of liquid crystals with dynamic scattering. When an electrical field is applied, such materials show orientation distortions which yield a low scattering efficiency but a strong depolarization of light. Since a higher conductivity is generally associated with a shorter lifetime, a longer lifetime can be expected with the purified nematic liquid crystals.

If a mixture of a nematic and a cholesteric material is applied as the liquid crystal, the described arrangement will result in a two-color representation with storage effect, whereby the sign does not disappear after the voltage has been switched off, but remains constant for a time.

This storage effect is due to the fact that, when an electric field is applied, a focal-conical texture will be produced from the planar texture, which has a strong depolarizing effect and which remains after the electric field has been switched off for a fairly long period of time.

The suggested arrangement is suited for all kinds of liquid crystal displays, such as process computer indication or as a liquid crystal picture screen with a ferroelectric ceramic layer.

If the electrodes are not segmented but extend all over the entire liquid crystal surface, this arrangement will be able to produce electrically-switchable color filters, whereby desired color combinations can be obtained by switching two or several arrangements behind each other.

Although various minor modifications might be suggested by those versed in the art, it should be understood that we wish to embody within the scope of the patent granted hereon all such modifications that reasonably and properly come within the scope of our contribution to the art.

We claim:

1. In an arrangement for providing multi-color data indication comprising a liquid crystal layer having optical properties which are changeable by an application of an electrical field disposed between a pair of glass plates, means for applying an electrical field to selected area of the liquid and a light source directing a beam of light onto the liquid crystal layer the improvements comprising a neutral polarizer, and means for selectively polarizing a selected portion of wavelenghts of the light beam, said polarizer and said polarizing means being disposed in the path of the light beam with the liquid crystal layer disposed therebetween so that with no electrical field applied to said liquid crystal layer, a light of one color is seen and the application of an electrical field to a portion of the liquid crystal layer causes the portion to depolarize the light passing through the portion to provide light of a second color at the portion.

2. In an arrangement according to claim 1, wherein said polarizing means is a selective polarizer for polarizing all light except for a given color.

3. In an arrangement according to claim 2, wherein the selective polarizer is a linear polarizer.

4. In an arrangement according to claim 2, wherein the selective polarizer is a circular polarizer.

5. In an arrangement according to claim 1, wherein the neutral polarizer is a linear polarizer.

6. In an arrangement according to claim 1, wherein the neutral polarizer is a circular polarizer.

7. In an arrangement according to claim 1, wherein said polarizing means comprises at least one neutral polarizer and an optical delay plate for changing the state of polarization in dependence of the wavelength.

8. In an arrangement according to claim 7, wherein the optical delay plate is a birefringent material.

9. In an arrangement according to claim 1, wherein one of the glass plates is colored.

10. In an arrangement according to claim 1, wherein said liquid crystal layer is a nematic liquid crystal having a high resistance, and wherein the means for applying an electrical field are segmented electrodes provided on each of said pair of glass plates.

11. In an arrangement according to claim 10, wherein said liquid crystal layer is colored.

12. In an arrangement according to claim 1, wherein the liquid crystal layer comprises a mixture of nematic and cholesteric material and wherein said means for applying an electric field comprises segmented electrodes disposed on each of the glass plates of said pair.

13. In an arrangement according to claim 12, wherein said liquid crystal layer is colored.

14. In an arrangement according to claim 1, which includes a diffusing reflector provided on one of the pair of glass plates for reflecting the beam of light back through the layer.

15. In an arrangement according to claim 1, which includes a diffusing element which is arranged to increase the angle of observation of the light leaving the liquid crystal layer.

16. In an arrangement according to claim 15, wherein said means for applying an electrical field to said layer are a plurality of electrodes disposed on the pair of glass plates, and wherein said diffusing elements are the electrodes on one of said pair of plates.

17. In an arrangement of claim 1, wherein a color absorption layer is disposed in the path of said beam.

* * * * *